Dec. 1, 1970  P. J. WEAVER  3,543,617
LATHE
Filed Dec. 23, 1968
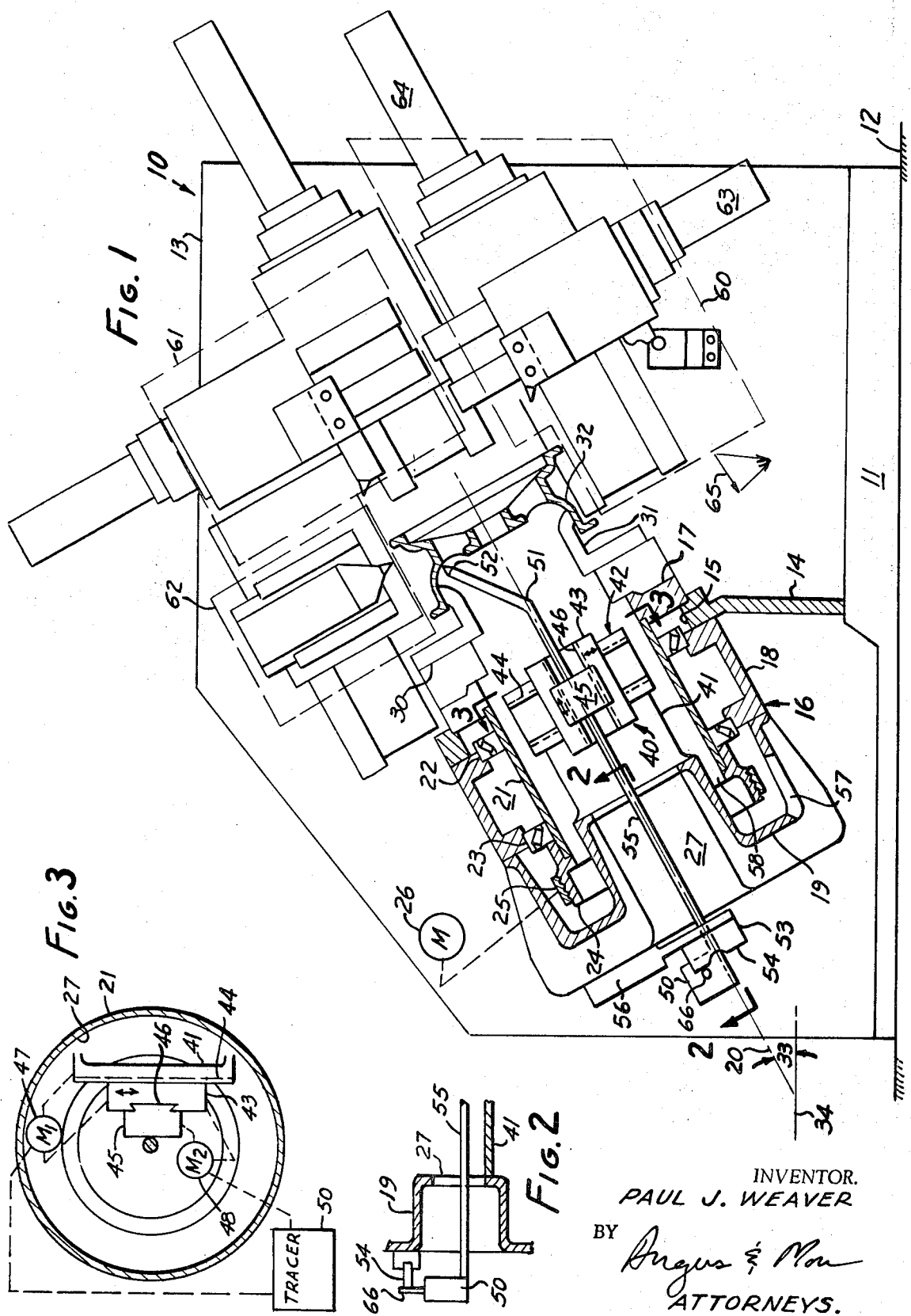
INVENTOR.
PAUL J. WEAVER
BY
ATTORNEYS.

United States Patent Office 3,543,617
Patented Dec. 1, 1970

3,543,617
LATHE
Paul J. Weaver, San Marino, Calif., assignor to Graning-Weaver Company, El Monte, Calif., a corporation of California
Filed Dec. 23, 1968, Ser. No. 786,012
Int. Cl. B23b 3/28
U.S. Cl. 82—14   8 Claims

ABSTRACT OF THE DISCLOSURE

A lathe with a base and a rotatable spindle mounted to the base which carries a chuck means. The spindle and chuck means have a common axis of rotation that is disposed at an acute angle, preferably 30°, to the horizontal to aid in loading the lathe. The spindle may have a central port extending therethrough to pass a tool slide system which is mounted to the base, thereby permitting machining of inside surfaces of a workpiece from the chuck side thereof.

---

This invention relates to lathes and, in particular, to a tracer lathe.

Tracer lathes are well known. Their principal property is that of providing a driven spindle which turns the chuck which holds the workpiece to be turned by a cutting tool so that a tracer and control system which utilizes a tracer (which may be a hydraulic or electronic type, as two examples), reacts with the contour of a template to control the motion of a cutting tool which is mounted to a pair of slides. Motive means is interconnected between the slides and connected to the tracer, whereby to cause the slides to move the tool relative to the workpiece, and the template and tracer relative to each other, in order to duplicate in the workpiece the contour of the template. Either the tracer or the templae is mounted to the base, and the other is mounted to the element which supports the tool.

Lathes in general, and tracer lathes in particular, are well known, and involve certain disadvantages which it is the object of this invention to overcome. One problem encountered both in vertical and in horizontal lathes is the difficulty of loading heavy workpieces such as blanks from which wheels will be made. If the axis of rotation of the spindle is vertical, then it is laborious to support the workpiece and center it on the chuck. The workpiece must be lifted across a critical path which often is obstructed by machine tool components, and the process requires considerable effort. If the axis is horizontal, then much of the weight of the workpiece must still be supported by the operator during the loading cycle plus another horizontal force needed to hold the workpiece against the chunk jaws while the clamping action is taking place. Both of the foregoing undesirable characteristics are overcome by orienting the axis at an acute angle, preferably 30°, such that an axial component of force which is derived from the weight of the workpiece holds the workpiece against the chuck jaws.

Still another objectionable feature of conventional tracer lathes is the inability to make a cut on the surface of the workpiece at the chuck end. It is therefore often necessary for a workpiece to be handled twice, in order to reverse its position. This introduces errors in the work, and also requires that the machine be shut down during this work-handling operation. The ability to perform operations on both sides of the workpiece with a single chucking provides greater control of concentricity and parallelism, and minimizes down time of the machine.

A lathe according to this invention includes a base with a rotatable spindle mounted to it, the base having an axis of rotation disposed at an acute, non-perpendicular angle to the base. Chuck means is mounted to and driven by the spindle and is adapted to hold and, as it is driven, to turn a workpiece around the axis of rotation. Cutting tool means is adjustably movably mounted to the base to cut a contour in the workpiece. The chuck means has as a consequence of said acute angulation a vertical and an axial component, the axial component of the weight of the workpiece pressing the workpiece against the chuck means in order to aid in the loading of the workpiece into the chuck means.

According to a preferred but optional feature of this invention, the spindle has a central port extending from end to end thereof, and a bi-axial tool slide assembly mounted to the base and projecting into the axial port of the spindle so as to work within and beyond the chuck means and machine the inside portion of a workpiece on its chuck side.

The above and other features of this invention will be fully understood from the following detailed description and the accompanying drawings in which:

FIG. 1 is a side elevation of a lathe according to the invention, partly in schematic notation; and FIGS. 2 and 3 are fragmentary cross-sections taken at lines 2—2 and 3—3 of FIG. 1.

A lathe 10 is shown in FIG. 1 which includes a section 11 adapted to rest on a floor 12 and an upright section 13 extending from the base section. A support 14 comprises an upright flange mounted to the base and to sections 11 and 13, and has an opening 15 to receive still another support 16 therein. This latter support is made up of a retainer section 17, a center section 18, and a base section 19, all of which are joined together and held in support opening 15 of support 14. These establish an axis of rotation 20.

A spindle 21, in which is tubular, is rotatably supported by bearings 22, 23 in center section 18. The spindle has a pulley 24 attached thereto, which spindle is driven by a belt system 25, which in turn is driven by a motor 26 mounted to the base so as to rotate the spindle around the axis of rotation. It will be noted that the base section 19 and the spindle have a central axial port 27 extending from end to end thereof.

A chuck 30 is attached to and rotated by the spindle, having conventional clamp means 31 for grasping a workpiece 32 and turning the same for machining purposes. The workpiece shown is a wheel blank which is to be finished to a desired contour on the lathe. Rotating the spindle by applying power from motor 26 through the belt system will turn the spindle, chuck, and workpiece.

It will be noted that an angle 33 is formed between the axis of rotation and the horizontal 34. This angle is acute and non-perpendicular relative to the horizontal. For reasons yet to be disclosed, it will preferably be no greater than 45° and, in the preferred embodiment as shown, is substantially equal to 30°.

In order to machine the surfaces, various tool slide and control assemblies are shown. The first of these comprises one of the features of the invention and is shown in FIG. 1. It is referred to as a bi-axial tool slide and control assembly 40. It includes a support plate 41 which is mounted to base section 19 of support 16 and projects into the central port in the spindle. It will be noted that neither support 16 nor support plate 41 rotates, but instead they are mounted to the stationary base through support 14. To support plate 14 there is mounted first ways 42 whose axis in plan view is normal to the axis of rotation. A first slide 43 is mounted to the first ways by means of a conventional dove tail assembly 44. A second slide 45 is mounted to the top of the first slide by means of a second dove tail assembly 46. The axis of motion of the first slide is obliquely related to the axis of rotation (it may be normal to it), and that of the second slide is parallel to it. The motions of the two slides are therefore oblique to each other. They are preferably, but not necessarily, normal to each other.

Motor means 47 and 48 (FIG. 3) are respectively disposed between the first ways and the first slide and between the first end and second slides to cause the slides to move along their respective axes. These motor means may for example be electric or hydraulic motors, or any other suitable type of motive means. They are under control of a tracer means 50 which may conveniently be a hydraulic tracer valve if the motor means are hydraulic motors such as piston-cylinder or rotary types.

Tool holder means 51 is mounted to the second slide and supports a cutting tool 52. It will be noted that the cutting tool may work within the radial region and beyond the axial extent of the chuck means, on the chuck side of the workpiece.

The tracer means operates in the manner conventionally recognized for such devices by operating against a template 53 with a contour 54 to be copied. Either the tracer means or the template is mounted to the body, and the other of these is mounted to the second slide. In the device shown, the tracer valve is mounted to the second slide by means of an extension 55, and the template is mounted to a template holder 56 that is mounted to base section 19 of support 16. The extension 55 and the tool holder means 51 are shown schematically, as are the ways and slides, these being conventionally made, the disclosure being simplified for purposes of illustration.

A chip port 57 is provided in base section 19 and a chip passageway 58 is provided between the spindle and the inner walls of the base section so as to clear the chips formed in the internal turning operations.

The control means which directs cutting tool 52 is a direct tracer system. It could, of course be another type of control such as master slave units, numerical control, or even manual. The same is true of the various other control systems used in this machine.

The foregoing enables machining to be done on the chuck side of a workpiece while similar machining is performed in other areas. Second, third and fourth tool slide and control assemblies 60, 61 and 62 are shown mounted to the base, all of which include first ways, first and second slides, motive means and tracer template arrangements as control means, all as heretofore described in connection with assembly 40. Only assembly 60 is shown in any greater detail with the tracer valve, template, cutting tool and motors 63, 64 for the reason that all of these systems will have the same components as that of assembly 40, and there is no reason to repeat all of their details. Suffice it is to say that system 60 is shown for performing a facing operation on the workpiece, assembly 61 for an internal boring operation, and assembly 62 for performing an external turning operation. It will thereby be seen that a major percentage of the surfaces to be machined on the wheel are able to be reached with one chucking, and that this would include, especially in the part shown, many of the regions whose concentricity and relative tolerances are most important.

The operation of the device should be evident from the foregoing. In order to load and unload the machine, the tool is first retracted from the chuck region, the chuck is opened, and a workpiece loaded in. It will be noted that there is an axial component 65 which comprises a force tending to load the workpiece against the jaws during the loading process, thereby relieving the operator from much of the effort heretofore required to hold the workpiece in position while the chuck jaws are being actuated. The reason for selecting an angle 33 which is less than 45° is that at this angle the axial component of force relative to the weight is optimized, and the advantage lessens as the angle increases. For practical machine operation, the relationship of a 30° angle is to be preferred.

After the chuck means is actuated, the spindle is rotated, and the tracing cycle is begun, the tracer valve following the template by means of contact between its stylus 66 and contour 54 of the template, whereby the cutting tool traces an identical path in space to duplicate the contour in the workpiece. This is a conventional operation, such as that one which is shown in Paul J. Weaver Pat. No. 3,055,393. Such a cutting operation may be carried out simultaneously with any number of tool slide and control assemblies. After the completion of all tracer cycles, the cutting tools are retracted, the spindle stopped, the chuck released, and the workpiece removed, again at a comparatively low elevation, with some vertical support from the chuck, and with minimized effort on the part of the operator.

From the foregoing, it will be appreciated that the lathe has the property, when the angle 33 is provided, to greatly assist the operator in the handling of the workpieces. Such angle is optional and is independent of the use of the hollow spindle with slide and control assembly 40, this providing an additional feature of machining capability. The two combined provide an improved tracer lathe which is simpler for the operator to use and which significantly reduces total machine time.

I claim:

1. A tracer lathe comprising: a base; a rotatable spindle mounted to the base and having an axis of rotation and a central axial port extending from end to end thereof; spindle drive means drivingly engaged to the spindle for turning the same; chuck means carried by the spindle for holding a workpiece to the spindle and rotating the same around said axis; a bi-axial tool slide and control assembly mounted to the base and projecting into the axial port of the spindle, said assembly including a base ways mounted to the base, a first slide mounted to the base ways for sliding movement along said base ways, a second ways mounted to the first slide extending obliquely to the base ways, and a second slide mounted to the second ways for sliding movement along said second ways, a tool holder mounted to said second slide, first and second motive means respectively connected to the first and second slide to cause their respective movements, control means controlling said motive means to position the tool holder to cut a predetermined contour on a workpiece mounted to the chuck means, the tool holder being so disposed and arranged as to hold a cutting tool in the region within and axially beyond the chuck means so as to machine the inside of the workpiece.

2. A tracer lathe according to claim 1 in which the control means comprises: a template member having a contour to be copied, a tracer member connected to the motive means for controlling operation of said motive means in response to the reaction between itself and the contour of the template, one of said members being mounted to the base and the other member being mounted to the second slide.

3. A tracer lathe according to claim 2 in which the axis of rotation is disposed at an acute angle to the horizontal.

4. A tracer lathe according to claim 3 in which the said acute angle is less than 45°.

5. A tracer lathe according to claim 3 in which the acute angle is substantially 30°.

6. A tracer lathe according to claim 2 in which a second bi-axial tool and control assembly is mounted to the base exteriorly of the spindle whereby to machine exterior portions of a workpiece held by the chuck means.

7. A tracer lathe according to claim 6 in which the axis of rotation is disposed at an acute angle to the horizontal.

8. A tracer lathe according to claim 7 in which the acute angle is substantially 30°.

References Cited

UNITED STATES PATENTS

| 2,130,341 | 9/1938 | Garrard | 82—20 X |
| 2,305,812 | 12/1942 | Regul | 77—3 X |
| 3,207,013 | 9/1965 | Ponnath | 82—14 |

GIL WEIDENFELD, Primary Examiner

U.S. Cl. X.R.

82—2